(12) United States Patent
Wu et al.

(10) Patent No.: US 8,422,403 B2
(45) Date of Patent: Apr. 16, 2013

(54) SYSTEM AND METHOD FOR MULTI-PARTICIPANT VIDEO CONFERENCE WITHOUT MULTIPOINT CONFERENCING UNIT

(75) Inventors: I Wei Wu, Yunlin County (TW); Szu Hsien Huang, Hsinchu County (TW); Yi Hsin Cheng, Hsinchu County (TW); Chia Ho Lee, Taichung County (TW)

(73) Assignee: Industrial Technology Research Institute, Hsinchu County (TW)

( * ) Notice: Subject to any disclaimer, the term of this patent is extended or adjusted under 35 U.S.C. 154(b) by 1157 days.

(21) Appl. No.: 12/106,630

(22) Filed: Apr. 21, 2008

(65) Prior Publication Data

US 2009/0167841 A1    Jul. 2, 2009

(30) Foreign Application Priority Data

Dec. 28, 2007 (TW) .............................. 96150697 A

(51) Int. Cl.
*H04L 12/28* (2006.01)
(52) U.S. Cl.
USPC ......................................... 370/256

(58) Field of Classification Search .................. 370/256, 370/312, 238, 254, 390, 252, 432, 255; 709/224
See application file for complete search history.

(56) References Cited

U.S. PATENT DOCUMENTS

| | | | |
|---|---|---|---|
| 7,689,822 B2 * | 3/2010 | Maggenti et al. ............. | 713/151 |
| 7,911,981 B2 * | 3/2011 | Park et al. ..................... | 370/256 |
| 2003/0120917 A1 | 6/2003 | Itonaga et al. | |
| 2004/0236863 A1 | 11/2004 | Shen et al. | |
| 2005/0074031 A1 | 4/2005 | Sunstrum et al. | |
| 2005/0152367 A1 | 7/2005 | Park et al. | |
| 2005/0201278 A1 | 9/2005 | Banerjee et al. | |
| 2006/0007947 A1 | 1/2006 | Li et al. | |
| 2006/0187860 A1 | 8/2006 | Li et al. | |
| 2006/0245378 A1 | 11/2006 | Jeong et al. | |
| 2007/0036175 A1 | 2/2007 | Zimmermann et al. | |
| 2007/0086366 A1 | 4/2007 | Luo et al. | |

* cited by examiner

*Primary Examiner* — Chandrahas Patel
(74) *Attorney, Agent, or Firm* — WPAT, P.C.; Anthony King

(57) ABSTRACT

The method for multi-participant video conference without a multipoint conferencing unit includes the following steps: generating a multicast forest; adjusting the video resolution to lower the streaming rate; and limiting the audio multicast numbers of the members. The multicast forest includes a plurality of multicast trees and the ways of connections of the nodes in trees are all different from each other.

22 Claims, 7 Drawing Sheets

SYSTEM AND METHOD FOR MULTI-PARTICIPANT VIDEO CONFERENCE WITHOUT MULTIPOINT CONFERENCING UNIT

BACKGROUND OF THE INVENTION

The present invention relates to a video conference system and method, and more particularly, to a system and method for conducting multi-participant video conference without a multipoint conferencing unit.

With the popular development of network systems and dramatically increasing bandwidth, more and more network-based technologies tend to be applied to low-cost applications. Among those, video conference equipment is one of the best examples.

FIG. 1 shows a popular structure of a multipoint conferencing unit. When a video conference is set up, a multipoint controlling unit (MCU) 101 mixes audio/video signals from user ends 102-105 and then redistributes them to the user ends 102-105. However, increases in capacity for more conference participants correspond to increases in the cost of the MCU.

To avoid high setup costs of the MCU, some have proposed the use of a point-to-point network structure, with IP multicast technology attracting the most attention. This technology involves a router that receives packets from senders and then duplicates the packets to addressees. Such technology omits the expensive MCU and relies heavily on network bandwidth and point-to-point technology. However, the router must be set up by ISP providers, and due to low incentive, the technology is not widely used.

Application-Layer-Multicast (ALM) has been proposed as an alternative solution. This technology uses multiple unicasts to simulate a one-to-many broadcast. The broadcaster has to make many copies himself before sending to other addressees. Under this scenario, the transmission bandwidth constitutes a significant bottleneck.

US patent publication 2006/0187860 discloses a multipoint video conference using ALM, particularly a mesh-connected mutual-cast clique responsible for audio mixing and transmission of voice packets. Although no MCU is required, a mutual-cast clique still needs to be established and maintained. This kind of structure is complicated, has no potential for improving the performance of audio/video streams, and is inconvenient for most users.

US patent publication 2007/0036175 discloses a voice conversation system based on point-to-point technology. This prior art merely establishes a multicast tree, which is used by all nodes to transmit packets. However, such structure is not easy to reinstate if some intermediate nodes in the multicast tree fail. Additionally, because the connection between nodes is fixed, the transmission path is unchangeable. Therefore, it is common for some links to bear a heavy transmission burden, while others bear a light load. Due to the imbalance in loading, the capacity of the network is not efficiently utilized.

In sum, the foregoing prior arts either did not provide a mechanism in the audio/video stream to adequately control flow so as to increase the ALM transmission performance, or failed to balance the loading burden of each link.

SUMMARY OF THE INVENTION

The method for conducting multi-participant video conference without a multipoint conferencing unit according to an embodiment of the present invention comprises the steps of: establishing a multicast forest; adjusting video encoding/decoding calculation for nodes in the multicast forest; and controlling the number of audio encoding/decoding devices; wherein the multicast forest is a hierarchy network having a root node at the top of the hierarchy network, intermediate nodes, and leaf nodes at the bottom of the hierarchy network.

The multi-participant video conference system without a multipoint conferencing unit according to an embodiment of the present invention comprises means for establishing a multicast forest which organizes a plurality of node devices each connected to each other with a communication network so as to form a plurality of multicast trees with different permutations; and means for limiting audio/video encoding/decoding calculation amount in accordance with the calculating capability of a node device. The above means may be implemented by an arithmetic and logic unit (ALU) of a processor. Through the special defined functions, the ALU is transformed into a special purpose one.

The child nodes that are indirectly connected to the underlying node and beneath the underlying node are called grandchild nodes.

BRIEF DESCRIPTION OF THE DRAWINGS

The invention will be described according to the appended drawings in which.

EMBODIMENT OF THE PRESENT INVENTION

Figure 1:
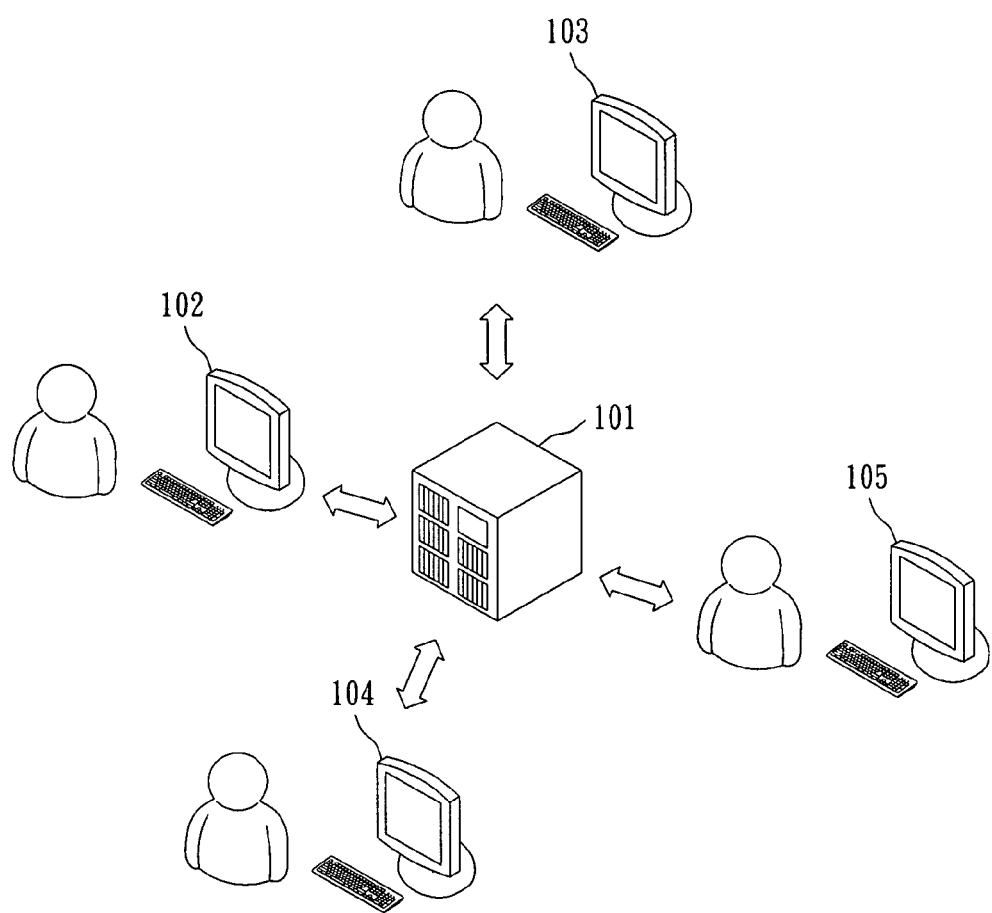
FIG. 1 shows a popular structure of a multipoint conferencing unit.
Figure 2:
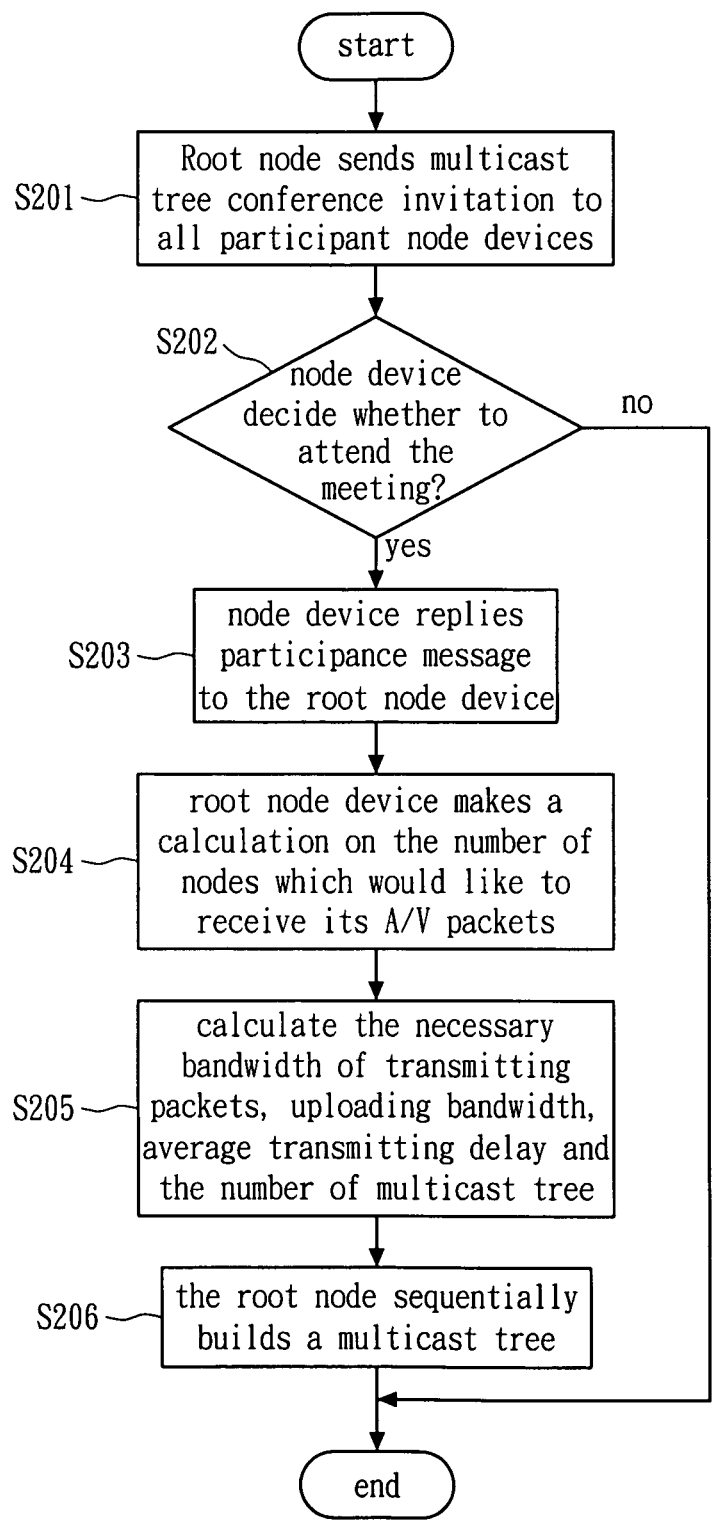
FIG. 2 shows a flow chart of setting a multi-participant video conference without a multipoint conferencing unit according to one embodiment of the present invention.

FIG. 2 shows a flow chart of setting a multi-participant video conference without a multipoint conferencing unit according to one embodiment of the present invention. In step S201, a root node sends a multicast conference invitation to all participant nodes. In step S202, the receiving node decides whether to attend the conference. In step S203, the node deciding to attend the conference sends a confirmation reply to the root node. In step S204, the root node calculates the number of nodes which would like to receive its audio packets. In step 205, the root node calculates the necessary bandwidth to transmit its packets, the upload bandwidth, the average transmission latency and the number of multicast trees. In step 206, the root node sequentially builds a plurality of multicast trees and then organizes them into a multicast forest.

Figure 3:
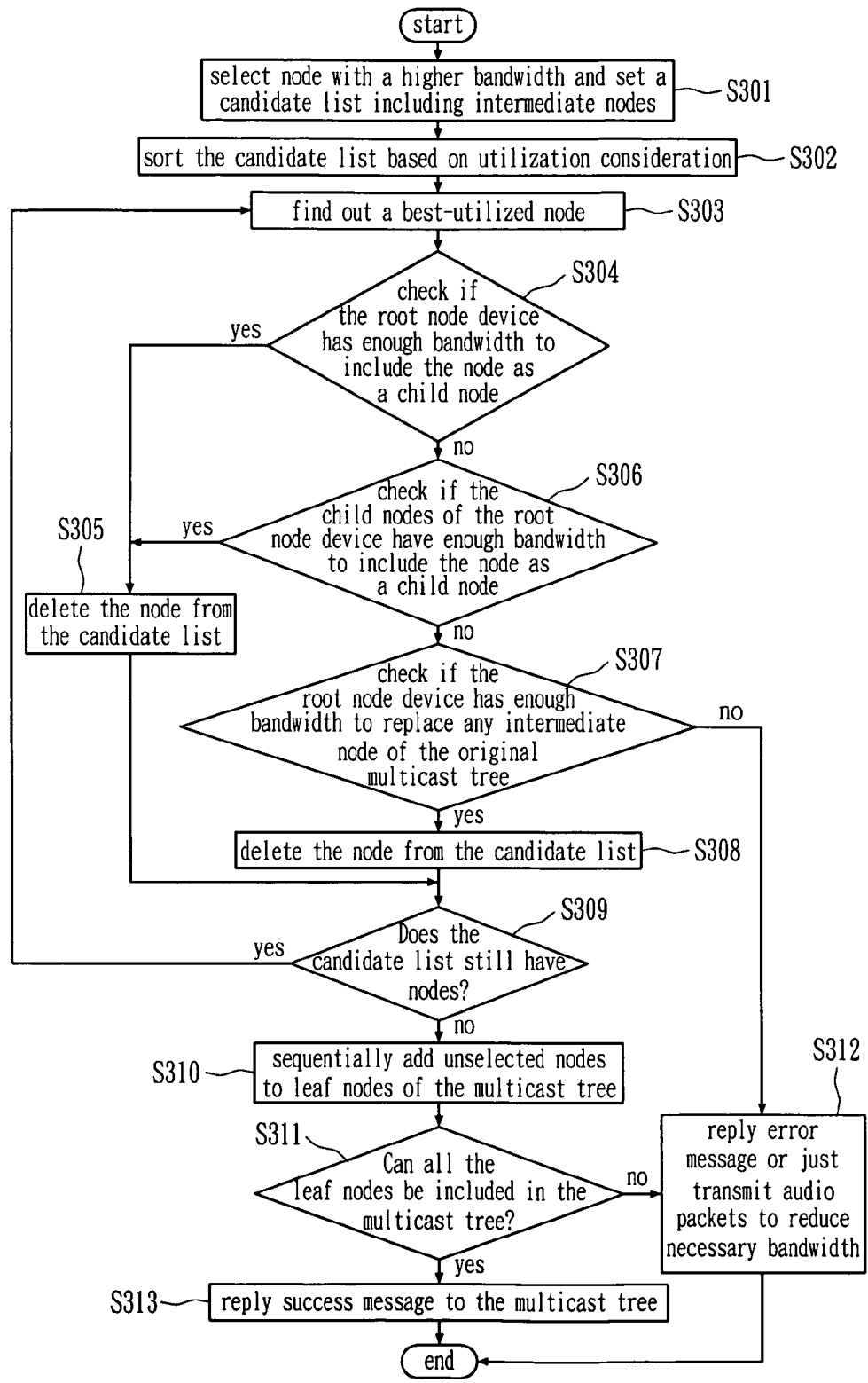
FIG. 3 shows a method of establishing a multicast tree according to one embodiment of the present invention.

FIG. 3 shows a method of establishing a multicast tree according to one embodiment of the present invention. In step S301, a node with a higher bandwidth is selected and used to establish a candidate list including intermediate nodes. The selecting method includes the following formula:

$$\frac{av\_up\_bw}{avg\_num\_children} \geq \frac{avg\_av\_bw\_req}{num\_trees}$$

Where the parameter av_up_bw represents the upload bandwidth of the node, the parameter avg_num_children represents average number of child nodes of this underlying node, the parameter avg_av_bw_req represents the necessary bandwidth to transmit audio/video packets, and the parameter num_trees represents the number of multicast trees. Any node satisfying the above equation will be included in the candidate list. The parameter avg_num_children is obtained by the calculation based on the owned bandwidth of this underlying node and the audio/video transmitting bandwidth of this underlying node, and the parameter num_trees is limited to the maximum acceptable transmission latency, which is represented as follows:

$$\text{avg\_num\_children} = \frac{\alpha \times \text{avg\_up\_bw}}{\text{avg\_av\_bw\_req}}$$

$$\text{max\_tree\_level} \leq \frac{\text{max\_transmission\_latency}}{\text{avg\_node\_delay}}$$

$$\text{num\_trees} \geq \frac{\frac{\text{avg\_num\_children}^{\text{max\_tree\_level}+1} - 1}{\text{avg\_num\_children} - 1} - \frac{\text{avg\_num\_children}^{\text{max\_tree\_level}} - 1}{\text{num\_nodes}}}{}$$

where avg_av_bw_req represents the necessary bandwidth to transmit audio/video packets, $0 < \alpha \leq 1$ max_transmission_latency is the greatest acceptable transmission latency, avg_node_delay represents average transmission delay per node, and num_nodes represents the quantity of all nodes. In step S302, the nodes in the candidate list are sorted based on a utilization consideration, that indicates nodes which own greater bandwidth and have less transmission burden when a multicast tree is established. The purpose of this step is to first select a node with greater utilization to balance the whole audio/video transmission of the system. The utilization calculation for sorting is based on the following equation:

$$\frac{\beta}{\text{curr\_ex\_times\_i\_node}} + \frac{1-\beta}{\text{curr\_in\_times\_i\_node}} + \frac{\gamma \times \text{av\_up\_bw}}{\text{avg\_av\_bw\_req}} + \frac{\rho}{\text{end\_end\_delay}}$$

where curr_ex_times_i_node represents the number of acting intermediate nodes in other multicast forest, curr_in_times_i_node represents the number of acting intermediate nodes in this multicast forest, av_up_bw represents upload bandwidth, end_end_delay represents the transmission latency between nodes, and $\beta$, $\gamma$, $\rho$ are weighting factors. After each node completes its calculation, a sorting from the top to the bottom is made. In step S303, a best-utilized node is found in the sorting list. In step S304, it is determined if the root node device has enough bandwidth to include the node as a child node. If the answer is affirmative, then this node is included. In step S305, the node is deleted from the candidate list after being connected to the root node. In step S306, if this node cannot be connected to the root node, then it is determined whether the child nodes of the root node device have enough bandwidth to include the node as a child node. In step S307, if this node has not yet become a child node of any node, then the system will inquire whether this node has extra upload bandwidth to replace original intermediate nodes. If affirmative, this node is replaced, and step S308 is performed. In step S308, the node is deleted from the candidate list. In step 309, it is determined whether there is any node in the list. If affirmative, step S303 is performed, and the next best-utilized node is selected. In step S310, the unselected nodes in step S301 are picked to sequentially place on the leaf nodes of the multicast tree. In step S311, it is determined whether all nodes are included in the established multicast tree. In step S312, if the answer is negative, then an error message is replied to the user and the transmission is made in a reduced quality manner, or audio packets only are transmitted so as to save necessary bandwidth. In step S313, if the answer is positive, then a success message is replied to the multicast tree. Thus, a new multicast tree is sought to be established.

Figure 4:
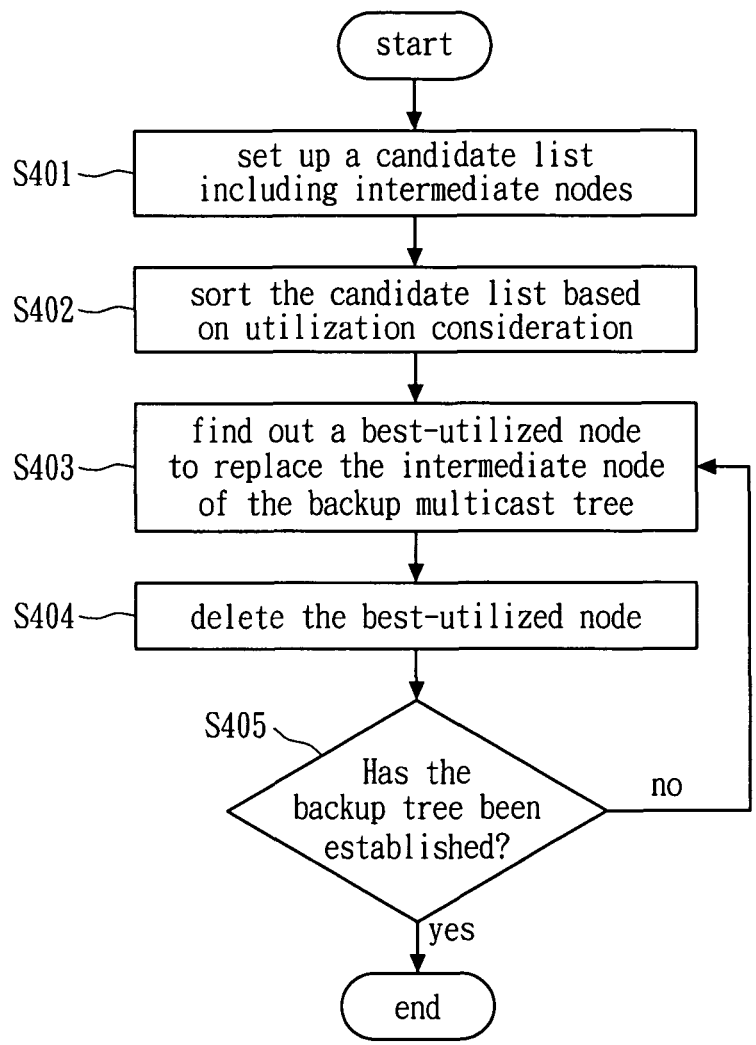
FIG. 4 shows a method of establishing a backup multicast tree according to one embodiment of the present invention.

FIG. 4 shows a method of establishing a backup multicast tree according to one embodiment of the present invention. The main function of the backup multicast tree is to act as a backup for the multicast tree; namely, if the multicast tree fails to transmit packets, the backup tree will immediately play a role to replace nodes of the multicast tree. Because the function of the backup tree is different from that of the multicast tree, the steps for establishing the backup tree are different from the steps for the multicast tree. The steps for establishing the backup tree are illustrated as follows. In step S401, a candidate list including intermediate nodes is established first, which includes all nodes except leaf nodes beneath the replaced intermediate node. In step S402, the candidate list is sorted based on utilization consideration. The utilization is calculated based on the following formula:

$$\frac{\lambda}{\text{curr\_ex\_times\_i\_node\_backup}} + \frac{1-\lambda}{\text{curr\_in\_times\_i\_node\_backup}}$$

wherein curr_ex_times_i_node_backup represents the number of intermediate nodes acted by the underlying node in other backup trees, curr_in_times_i_node_backup represents the number of intermediate nodes acted by the underlying node in this backup tree, and $\lambda$ represents a weighting factor. After each node calculates its value, a descending sort is performed. In step S403, a best-utilized node in the list is picked to replace the intermediate node of the backup multicast tree. In step S404, the best-utilized node is removed from the list. In step S405, it is determined whether the backup tree has been established. If so, then the process ends. Otherwise it will return to step S403 to replace intermediate nodes of the backup tree with the nodes in the candidate list.

Figure 5:
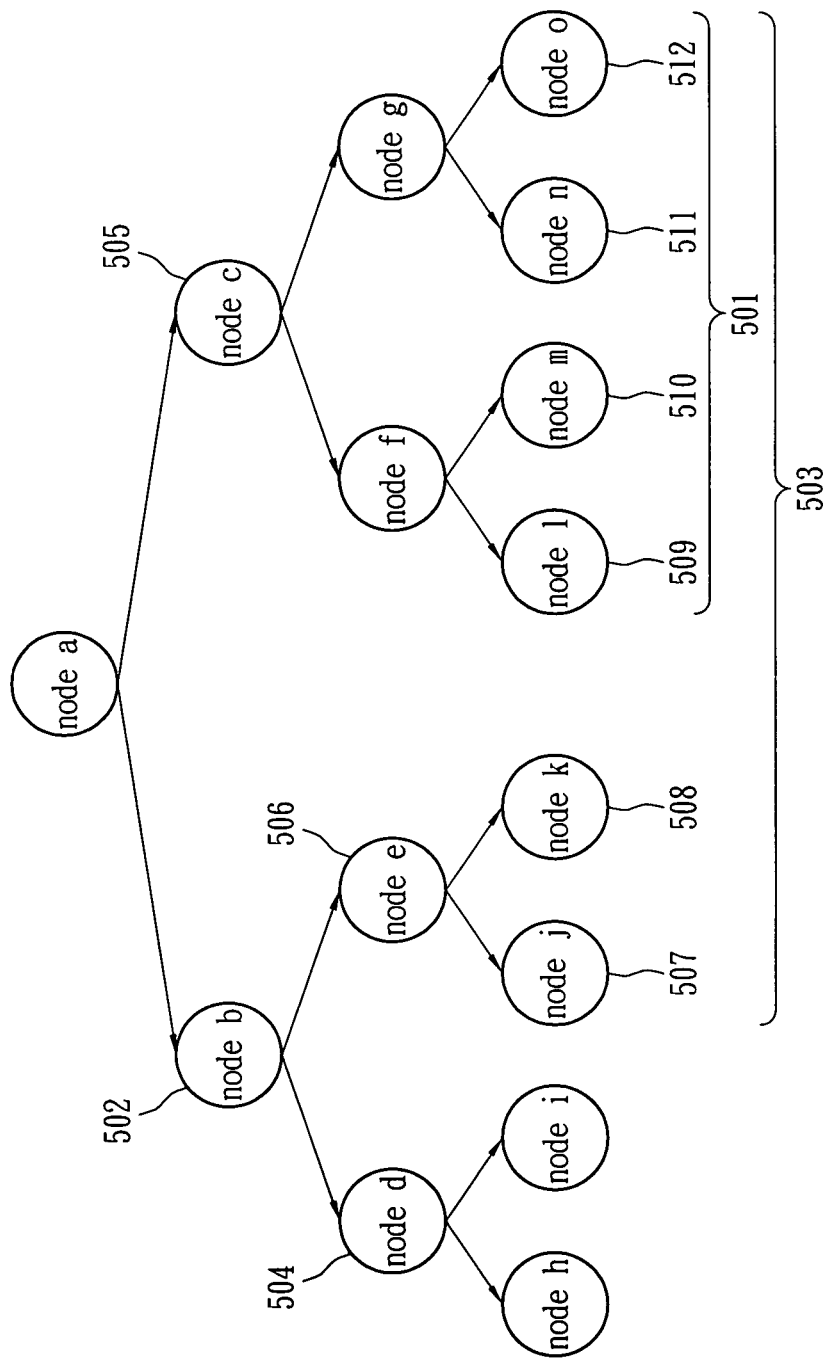
FIG. 5 shows a method of looking for members of a backup multicast tree according to one embodiment of the present invention.

FIG. 5 shows a method of looking for members of a backup multicast tree according to one embodiment of the present invention. The member of the established backup tree is composed of all nodes except leaf nodes beneath the replaced intermediate node. For example, in determining a candidate list to replace the node b(502), after examining the multicast tree of FIG. 5, a list 501 including node l(509), node m(510), node n(511) and node o(512), which are located beneath node c(505), is established. In determining a candidate list to replace the node d(504), except the leaf nodes beneath the node c(505), the leaf node j(507) and k(508) beneath the node e(506) also satisfy the conditions. Therefore, the candidate list 503 to replace node d(504) includes node j(507), node k(508), node l(509), node m(510), node n(511) and node o(512). Likewise, the candidate list to establish other intermediate nodes can be determined by similar steps.

Figure 6:
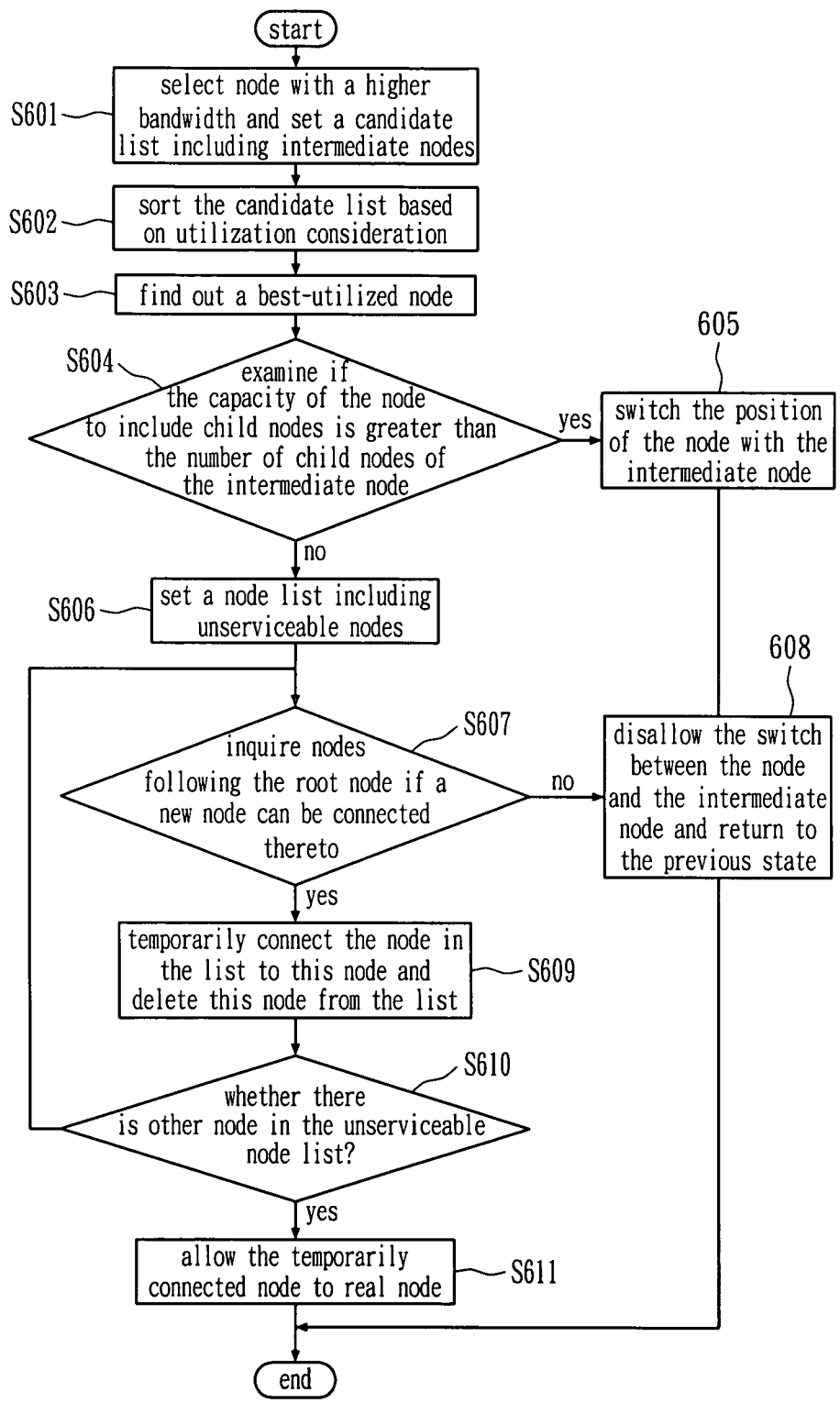
FIG. 6 shows a flow chart of updating a multicast tree.

FIG. 6 shows a flow chart of updating a multicast tree. In step S601, a candidate list including intermediate nodes and child nodes is established. In step S602, the candidate list is sorted based on utilization consideration, which is calculated as follows:

$$\frac{\beta}{\text{all\_ex\_times\_i\_node}} + \frac{1-\beta}{\text{all\_in\_times\_i\_node}} + \frac{\gamma \times \text{av\_up\_bw}}{\text{avg\_av\_bw\_req}}$$

wherein all_ex_times_i_node represents the number of acting intermediate nodes by this node in other multicast forests all_in_times_i_node represents the number of acting intermediate nodes by this node in this multicast forest, av_up_bw represents upload bandwidth of this node, avg_av_bw_req represents necessary bandwidth for this node to transmit its own audio/video signals, $\beta$ and $\gamma$ are weighting factors. After each node calculates its value, a sort subject to these values is performed. In step S603, a best-utilized node is located in accordance with the results of this sort. In step S604, it is determined whether the number of child nodes capable of being connected beneath this node is greater than the number of all the child nodes beneath the intermediate node. In step S605, if the answer in step S604 is affirmative, then the first node in the candidate list is switched with an intermediate node in the multicast tree. In step S606, if the answer in S604 is negative, then an 'unserviceable' list which is used to collect unserviceable nodes is established. In step S607, it is determined by examining the root node whether any node in the multicast tree can insert additional child nodes. In step S608, if the answer in step S607 is negative, then all connections will be restored to initial state and the update will be terminated. In step S609, the nodes in the unserviceable list are inserted into the node capable of inserting new nodes, and then that inserted node is removed from the list. In step S610, it is determined whether there are any nodes in the 'unserviceable' list. If so, then step S607 is performed. In step S611, if there are no nodes in the 'unserviceable' list, then all the insertion steps are confirmed and the process is ended.

The process of adding new nodes is the same as the process of establishing a multicast tree. However, all the audio/video packets still go through the original multicast forest until the new multicast forest is completely established.

The key factor influencing efficiency of normal operation is to reduce audio/video transmission and calculation. Regarding the video portion, the purpose is achieved by reducing pixel resolution of each image. When a meeting commences, the image resolution transmitting to each node is determined based on the number of nodes, and the image scale for each node is equal to the screen size, which is constant. Thus, the transmission and calculation are reduced. In addition, the image decoding at the receiving end is reduced also. Regarding the audio portion, the purpose is achieved by filtering audio from mute node(s) and/or from node(s) with smaller volume to reduce calculation and transmission. When a meeting commences, the system generates a given number of voice tokens based on the capability of nodes. Only nodes owning the voice tokens can conduct voice compression and transmission. The number of voice tokens is determined based on the calculation capability, that is, the number of voice channels simultaneously decoded by this node. The comparison of voice volume is represented by a newly added voice volume field whose content records the voice volume of that node. While a node is mute because of failure to get a voice token, that node will skip the step of voice compression and transmission. Thus, the calculation amount is reduced. In other words, only nodes owning the voice tokens can conduct voice compression, and because the transmission and the voice tokens are limited to a given number, each node is prevented from overloading.

Each node has to get a voice token before conducting compression and transmitting voice packets. The first step to obtain the voice token is to compare the volume of each node, and the node with louder volume will obtain the voice token in priority. The second step is to compare the weight of each node, and the node with higher weight will obtain the voice token in priority. Normally, the second consideration is given more weight than the first consideration.

Each node in the system is given a weight for identifying the user identification and position level, which determines the priority to obtain the voice token. Namely, the node with a higher weight is easier to preempt the voice token, or it can obtain the voice token from the node with lower weight if it does not own the voice token when it needs.

Figure 7:
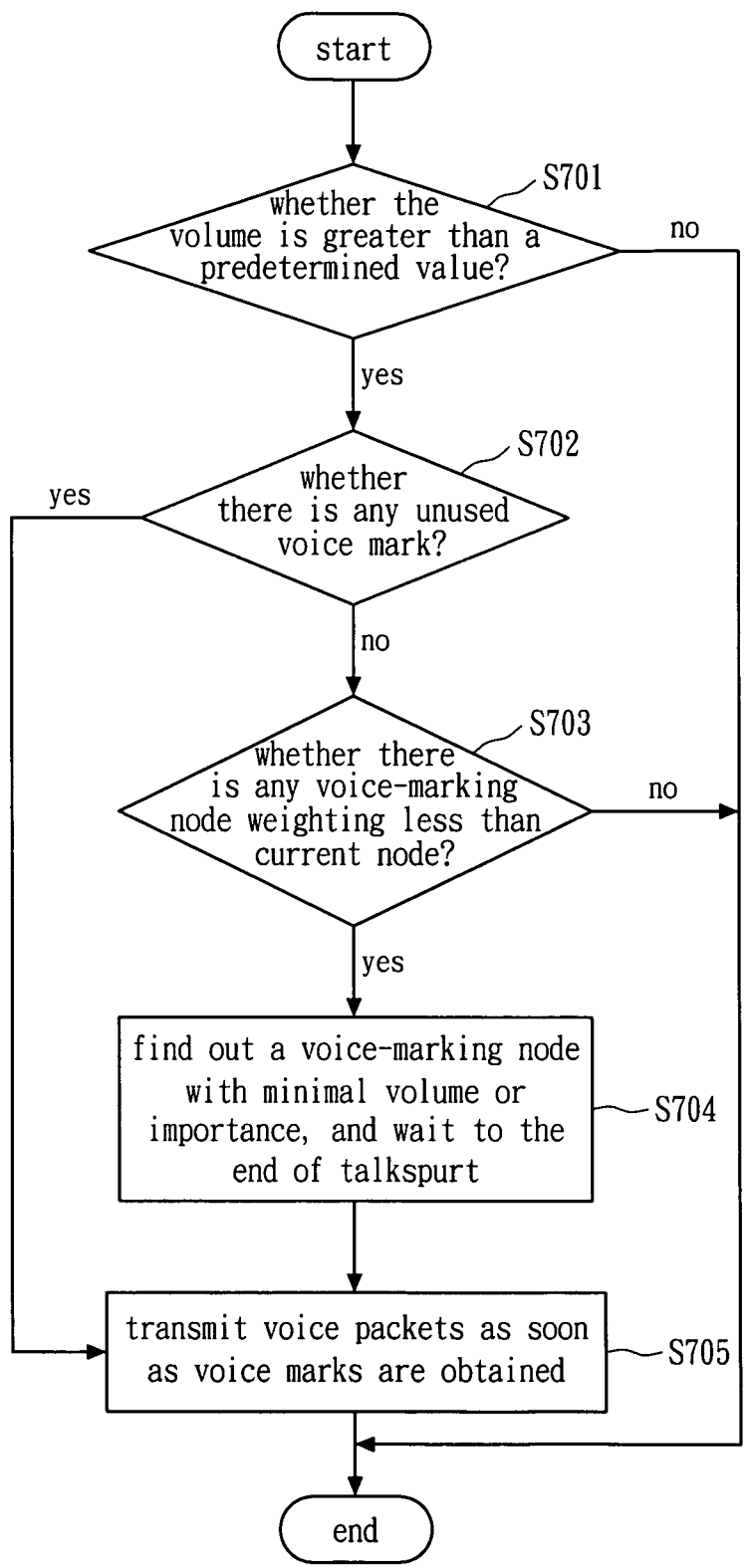
FIG. 7 shows a flow chart of transmitting voice packets.

FIG. 7 shows a flow chart of transmitting voice packets. In step S701, it is examined whether the volume of the node is louder than a predetermined value. In step S702, it is determined whether there is an unused voice token. In step S703, under the condition of no further available voice tokens, it is inquired whether there is a node owing the voice token which has a lower weight. In step S704, if the answer is affirmative, upon the ending of the talkspurt for that node the voice token is transferred. In step S705, the voice transmission is conducted for the underlying node.

The above-described embodiments of the present invention are intended to be illustrative only. Numerous alternative embodiments may be devised by person skilled in the art without departing from the scope of the following claims.

What is claimed is:

1. A method for conducting multi-participant video conference without a multipoint conferencing unit, comprising the steps of:
    establishing a multicast forest;
    adjusting video encoding/decoding calculation for nodes in the multicast forest; and
    controlling the number of audio encoding/decoding devices;
    wherein the multicast forest is a hierarchy network having a root node at the top of the hierarchy network, intermediate nodes and leaf nodes at the bottom of the hierarchy network;
    wherein the multicast forest is composed of multiple multicast trees, and the multicast trees have different permutations of nodes;
    wherein the establishing step comprises:
        selecting a plurality of node devices and establishing a candidate list;
        sorting the node devices in the candidate list;
        sequentially establishing the multicast tree in accordance with the sorted candidate list: and
        inserting node devices not listed in the candidate list into leaf nodes of the multicast tree.

2. The method of claim 1, wherein the adjusting step is conducted by using a low-resolution setup.

3. The method of claim 1, wherein the controlling step comprises:
    examining whether a mute state exists;
    examining whether the volume of a voice packet exceeds a predetermined value;
    examining whether a voice token is owned;
    obtaining a voice token after another node device has completed a voice transmission or robbing a voice token from another node device with a lower priority; and
    transmitting voice packets.

4. The method of claim 3, wherein the voice packets include a voice volume field for comparing voice volume.

5. The method of claim 3, further comprising a step of calculating the number of voice tokens.

6. The method of claim 1, wherein the number of child nodes is determined by the ratio of the upload bandwidth over the necessary audio/video-transmitting bandwidth.

7. The method of claim 1, wherein the node devices are sorted on a descending order based on transmission loading, average outbound bandwidth and transmission latency from the root node.

8. The method of claim 1, wherein the sorting step comprises:
  calculating a number ratio based on the number of acting intermediate nodes in the current and other multicast trees together with a weighting factor;
  setting a first ratio and a second ratio;
  calculating a bandwidth ratio based on the ratio of an upload bandwidth over audio/video transmitting bandwidth together with the first ratio;
  calculating a reciprocal of transmission latency based on the reciprocal of a transmission latency from the root node together with the second ratio; and
  calculating a sorting value based on the number ratio, bandwidth ratio and reciprocal of transmission latency.

9. The method of claim 1, wherein the selection of the nodes in the candidate list comprises selecting nodes which have larger upload bandwidth on average than necessary transmission bandwidth on average.

10. The method of claim 1, wherein the selecting step comprises:
  calculating upload bandwidth on average of child nodes of one node device;
  calculating necessary transmission bandwidth on average of the child nodes of the node device for each multicast tree; and
  selecting node devices that have larger upload bandwidth on average than the necessary transmission bandwidth on average.

11. The method of claim 1, further comprising an updating step, the step comprising:
  establishing a candidate list including an intermediate node device, child and grandchild node devices thereof;
  sorting the node devices in the candidate list including the intermediate node device, the child and the grandchild node devices thereof; and
  sequentially replacing or switching node devices in the multicast tree with the node device in the candidate list including the intermediate node device, the child and the grandchild node devices thereof.

12. The method of claim 11, wherein the sorting step comprises:
  calculating a number ratio based on the number of acting intermediate nodes in current and other multicast trees together with a weighting factor;
  setting a first ratio;
  calculating a bandwidth ratio based on the ratio of an upload bandwidth over audio/video transmitting bandwidth together with the first ratio; and
  calculating a sorting value based on the sum of the number ratio and bandwidth ratio.

13. The method of claim 11, wherein the node devices are sorted in descending order based on transmission loading, average outbound bandwidth and weighting factor.

14. The method of claim 1, further comprising a step of establishing a backup multicast tree, the step comprising:
  establishing a candidate list for a node device, wherein the candidate list for the node device comprises all leaf nodes except the leaf nodes beneath the node device;
  sorting the leaf nodes in the candidate list for the node device; and
  sequentially replacing or switching intermediate nodes in the multicast tree with the leaf nodes in the candidate list for the node device.

15. The method of claim 14, wherein the node devices are sorted in a descending order based on transmission loading in current and other backup trees.

16. The method of claim 14, wherein the nodes are sorted in descending order based on the number of acting intermediate nodes in the current and other backup trees and a weighting factor.

17. A multi-participant video conference system without a multipoint conferencing unit, comprising:
  means for establishing a multicast forest which organizes a plurality of node devices each connected to each other with a communication network so as to form a plurality of multicast trees with different permutations, wherein the establishing the multicast forest comprising:
    selecting a plurality of node devices and establishing a candidate list;
    sorting the node devices in the candidate list;
    sequentially establishing the multicast tree in accordance with the sorted candidate list: and
    inserting node devices not listed in the candidate list into leaf nodes of the multicast tree; and
  means for limiting audio/video encoding/decoding calculation amount in accordance with the calculating capability of a node device.

18. The system of claim 17, wherein the communication network is a local area network, Internet or combination thereof.

19. The system of claim 17, wherein the communication network is a wire network, wireless network or combination thereof.

20. The system of claim 17, wherein the location of a node device in the multicast tree is determined by an outbound available bandwidth and transmission loading of the node device.

21. The system of claim 17, further comprising means for establishing a backup multicast tree.

22. The system of claim 17, further comprising means for updating the multicast tree.

* * * * *